United States Patent [19]
Springsteen

[11] Patent Number: 4,912,720
[45] Date of Patent: Mar. 27, 1990

[54] LASER CAVITY MATERIAL
[75] Inventor: Arthur W. Springsteen, New London, N.H.
[73] Assignee: Labsphere, Inc., North Sutton, N.H.
[21] Appl. No.: 263,633
[22] Filed: Oct. 27, 1988
[51] Int. Cl.$^4$ ............................................. H01S 3/093
[52] U.S. Cl. ........................................ 372/72; 372/98
[58] Field of Search ........................ 372/92, 98, 69, 72

[56] References Cited
U.S. PATENT DOCUMENTS

| | | | |
|---|---|---|---|
| 4,217,557 | 8/1980 | Foster et al. | 372/89 |
| 4,523,319 | 6/1985 | Pfost | 372/54 |
| 4,764,932 | 8/1988 | Peterson et al. | 372/35 |
| 4,885,181 | 2/1989 | Gibson et al. | 372/72 |

Primary Examiner—Leon Scott, Jr.
Attorney, Agent, or Firm—Robert R. Tendler

[57] ABSTRACT

Polytetrafluoroethylene (PTFE), or like polymeric material is provided for use as a laser cavity material to efficiently couple flash lamp emissions into the laser medium due to its exceptionally high diffuse reflectance characteristic of better than 99%, which increases the laser output by as much as 100%. In one embodiment, a unique technique for fabricating the cavity includes both sintering and providing an optimal packing density prior to sintering, with the sintering to take place at atmospheric pressure to preserve the optimal packing density as closely as possible in the sintered product. This provides an optimal void percentage for optimal reflectivity. For PTFE, packing densities approaching 1.0 g/cm$^3$ yield an opaque optimally reflective material. Moreover, in one embodiment the unsintered particle size is maintained at less than 50 microns to obtain the machinability required for laser cavities, with the granular starting material having an impurity content of less than 10 particles per square inch so that disintegration or degradation of the laser cavity material due to pitting is prevented. Moreover, all presintering processing is done in a clean room to avoid contamination of the sintered product.

17 Claims, 2 Drawing Sheets

LASER CAVITY MATERIAL

FIELD OF INVENTION

This invention relates to a diffuse highly reflective polymeric material, and more particularly to both a method for increasing laser outputs and a material capable of being utilized in a laser cavity for increasing the laser output.

BACKGROUND OF THE INVENTION

Laser cavities, in the main, have been made either of specularly reflecting material or, more recently, of diffusely reflecting material. Diffusely reflecting material is preferred in laser cavity applications in order to more uniformly spread the energy from the flash lamp or other exciting means into the lasing material. A diffuse reflecting medium has the advantage of not limiting a laser cavity to a shape with focal points, opening the field to new laser cavity configurations.

The requirement for a highly efficient laser having a cavity made of diffusely reflecting material has resulted in the so called Kigre cavity which is a cavity in which a glass layer is formed over barium sulfate and which generally results in a 97% diffuse reflectivity. It has been found however that such cavities degrade quickly over time and usage, usually by yellowing. Other diffuse cavities have been made of a diffuse gold or silver coating. However, these cavities result only in 94% to 95% diffuse reflectivity.

What will be appreciated is that if the diffuse reflectivity could be increased from 97% to 99% in the visible or near IR region of the electromagnetic spectrum, the overall efficiency of the laser in this region would be increased by as much as 100%. Moreover, if the reflectance of the material in the visible and near IR can be increased, with frequency doublers or similar optical techniques a like advantage can be extended to lasers operating in the ultraviolet region.

However in the past it has been difficult to provide diffuse coatings or cavities made of diffuse material for a number of reasons. The most significant reason is the high energy environment which quickly causes discoloration, pitting, cracking or disintegration. In this regard, laser cavities are frequently subjected to energy in excess of 8 joules per square centimeter.

In a search for suitable materials for diffuse by reflecting laser cavities, up until the present invention, diffusely reflecting polymeric materials have not been employed. It should be noted that diffusely reflecting polymeric materials have been utilized for reflectance standards and coatings as described in U.S. Pat. No. 3,764,364 as well as in companion Patent No. 4,035,085. The above patents call for the utilization of a fluorinated aliphatic long chain addition polymer in pressed powder form or in film form for use as reflectance standards and reflectance coatings particularly in light integrating spheres of spectrophotometers.

By way of further background, an experiment by V. Weidner and J. Hsia reported in the Journal of Applied Optics, Optics News Nov. 1986 pps. 18–20, that powdered polytetrafluoroethylene (PTFE), heretofore used only in a packed powder form as a reflectance standard, could be sintered under pressure to produce a durable material for use in reflectometers. No laser cavity use was contemplated for this material. Note that Weidner and Hsia produced only small 2" diameter wafers unsuitable for laser use. Moreover, the reported material is not suitable for use as laser cavity material because carbon black is added to the granular mixture prior to heating. As will be appreciated, any contaminants within the laser cavity material provide sites for pitting and subsequent disintegration.

SUMMARY OF THE INVENTION

In contradistinction to prior use of sintered PTFE for reflectance targets, and in contradistinction to non-optimal prior packing densities, in the Subject Invention a diffuse highly reflective polymeric material is made into a laser cavity, with the material having a greater than 99% reflectance in the visible and near IR regions of the electromagnetic spectrum. Providing such a material for a laser cavity can result in doubling the laser output. Moreover, experimentation has shown that such material has survived energy concentrations of as much as 95 joules making it an ideal candidate for laser cavities.

In one embodiment, a unique process is used to produce laser grade cavities, in which a compressed block of polymeric material is sintered under atmospheric pressure so that critical low presintering packing densities can be maintained in the final product. The maintenance of low packing density provides for sufficient voids to produce optimal reflectivity; and this is demonstrated by the lack of translucency of the sintered product. As part of the Subject Invention, it has been found that the preferred void volume is in the range of 30% to 50% for optimal reflectance properties.

In one embodiment involving PTFE, an initial packing density of 0.856 grams per cubic centimeter results in a final density of 1.13 grams per cubic centimeter after sintering. This produces a highly reflective sintered material which is not translucent. It is a feature of the Subject Invention that sintering is performed at atmospheric pressure, which assures that the final density of the product can be precisely controlled to optimize void volume and thus reflectivity.

With atmospheric sintering, it is a finding of the Subject Invention that once cooled, an opaque white sintered polymeric material can be formed which has a nominal reflectance of greater than 99% over the wavelength range of 300–1,400 nanometers, greater than 98.5% over a range of 250–2,000 nanometers and, inter alia, a greater than 95% reflectance over the range of 250–2,500 nanometers. This is also true of unsintered product, assuming the unsintered product has an optimal packing density. This optimal packing density can be ascertained empirically for a wide variety of resins.

The class of materials contemplated for use in this invention is defined by those materials which comprise at least one fluorinated aliphatic long chain addition polymer comprised of at least one monomer having at least one fluorine atom attached to a chain carbon atom.

Polymers which fall within the above described class of materials are well known in the art and include the various homopolymers of the above described monomers, copolymers of these monomers and other monomers not of the above described class, and crosslinked polymers formed from these homopolymers and copolymers which will conform to the hereinafter described reflectance requirements. Some examples of these polymers are; polytetrafluoroethylene, polychlorotrifluoroethylene, polychlorofluoroethylene, polyvinylidene fluoride, and polyvinyl fluoride.

Some examples of monomers which may be used to make up both homopolymers and copolymers of the above-described polymers within the aforementioned class of materials are: 1.3-butadiene hexafluoride, 1-chloro-1-fluoroethylene, chlorotrifluoroethylene, 1.1-difluoroethylene, vinyl fluoride, 1-fluoroacrylonitrile, and fluorinated acrylicacids such as 1-fluoroacrylic acid and 2.2-difluoroacrylic acid, and tetrafluoroethylene.

Examples of other monomers which may be used with the above described monomers to form copolymers within the aforementioned class of materials are: ethylene, propylene, acrylic acid, methacrylate esters and the like.

Other possible high reflectance polymers are Dupont FEP or fluoronated ethylene Propylene copolymer; Dupont PEA, perfluoro alkoxy copolymer; polyisopropylidene fluoride; polyvinyl fluoride; polyvinylidene fluoride; polychlorofluoroethylene; and other polychlorofluoroalkenes.

With respect to doping, doped laser cavities can be made in accordance with the Subject Invention if the dopant is stable at the sintering temperature and the dopant particle size is less than or equal to that of the particulate material utilized in making the cavity. This means that for PTFE the dopant material size is desirably less than 50 microns.

It is also a requirement in making doped cavities that adequate mixing be performed to meet uniformity specifications. Also, the dopant and the material of the subject cavity must not interact at the sintering temperature.

Such doped materials have been previously manufactured for use as wavelength calibration standards with the various designations being WCS-HO, WCS-DO and WCS-EO corresponding to holmium, dysprosium, and erbium metal salts. Moreover, rare earth oxides such as those of Lanthanum, Neodymium, Praeseodymium, Ytterbium, Yttrium, Gadolinium and Samarium may be utilized as dopants. Previous work has shown that inorganic metal salts that are thermally stable at the sintering temperature of the material involved may be used as a dopant.

What has therefore been found is that when polymers of the type described are sintered at atmospheric pressure, an opaque polymer is produced which exhibits unexpectedly high reflectivity. The ability to control the reflectivity by sintering under atmospheric pressure means that by merely controlling the Packing density prior to sintering, one can control to a substantial certainty the density after sintering. Thus, for PTFE with an optimal density of 0.856 grams per cubic centimeter, the packing density after sintering can be controlled to 1.10–1.40 g/cm$^3$. It is noted that 99% reflectivity in the visible region of the electromagnetic spectrum requires a final sintered density of less than 1.5 g/cm$^3$ for PTFE.

One of the other critical parameters in the laser cavity manufacturing process is the particle size of the presintered granular material. With respect to the optimal particle size, presently, the range most useful for optimum reflectance and machinability is in the 20 to 50 micron range. PTFE resins do in fact come in particle sizes greater than 350 microns. However, these particles upon sintering yield only 97% reflectance due to lack of voids. Moreover, they are not easily machined because they crumble. The lack of machinability as well as the 2% lower reflectance at the wavelengths of interest make the 50 micron particle size desirable for PTFE granules.

In terms of manufacture, in one embodiment the laser grade material is prepared first by blending a suitable resin to a very fine particle size. In has been found that the laser grade material desirably has an impurity content of less than 10 particles per square inch.

It has also been found that it is critical that all presintering processing be done in a clean room to prevent contamination so that the impurity level can be kept to the above-mentioned low level.

After blending the material, for PTFE, it is compressed to a presintered density of between 1.0 and 1.2 grams per cubic centimeter. Lower pressure results in a material of high reflectance but more difficult machining problems, while over compression results in a material of lower reflectance due to increased translucence in the final product. Once compressed in a mold to a block of suitable size and shape, the block is placed on a plate and is sintered at a temperature of between 360° C. to 370° C. for a number of hours dependent on the size of the piece to be sintered.

Once sintered, the material is cooled slowly to avoid cracking. The final shape of the product is determined by machining of the sintered block. Machining can be done using normal machine shop equipment including lathes or milling machines, with the provision that the machining equipment be very clean in that no lubricant other than water be used in the machining. It is also a requirement that the material being machined not be compressed greatly during the machining process.

Final finishing of the product is then accomplished by sanding under a stream of water to remove any grit from the material. It is extremely important that the material be kePt free of all oil or solvents excluding water at all times during the process to retain its reflective properties without contamination.

The requirement for cleanliness in this procedure cannot be overstressed. Any impurity introduced into the material at any point in the process can cause major damage to the laser cavity when exposed to high intensity light, as in a flash lamp pumped laser system.

The advantages of a diffuse laser pumping cavity made in accordance with the teachings of this invention over existing ceramic cavities, metal reflectors, barium sulfate coatings and Samarium filter glass cavities are as follows:

First, the subject cavities have the highest known diffuse reflectance of any diffuse laser pump cavity substrate. Therefore less radiation is lost to absorption by the cavity material and more energy is coupled into the laser medium which results in a more efficient laser. As mentioned above, increasing the reflectance from 97% to 99% increases the laser output by 100%.

Secondly, the subject cavities are the most diffuse reflectors possible, and hence are responsible for extremely uniform pumping of the laser medium which results in an optimum beam profile.

Thirdly, the subject cavities may be fabricated using standard machine shop equipment except for the above mentioned cleanliness requirement so that cavity geometries may be prototyped easily and relatively inexpensively. The subject material is also compatible with various coupling geometries to suit user preference for special requirements.

Most importantly, the subject cavities have exceptionally long lifetimes because they are not subject to tarnishing as are diffuse silver reflectors. Moreover, the subject cavities are compatible with gas and liquid coolants and do not degrade when exposed to ultraviolet radiation as do barium sulfate cavities.

Moreover, regardless of the use of the subject material for laser cavities, because of its high reflectivity and machinability it can be used for other applications. The subject material may be doped to produce color reflectance standards, wavelength calibration standards and grey reflectance standards. Alternatively, it can be used undoped for any of a variety of situations demanding high diffuse reflectivity.

Polymeric material having 99% reflectivity can thus be obtained in machinable shapes and can be used wherever high reflectivity material is required. Note that the subject material can be used for laser cavities in an unsintered state assuming it can be encased in glass or some transparent non-degradable encapsulating medium or carrier.

BRIEF DESCRIPTION OF THE DRAWINGS

These and other features of the Subject Invention will be better understood taken in conjunction with the Drawings of which.

DETAILED DESCRIPTION

Figure 1:
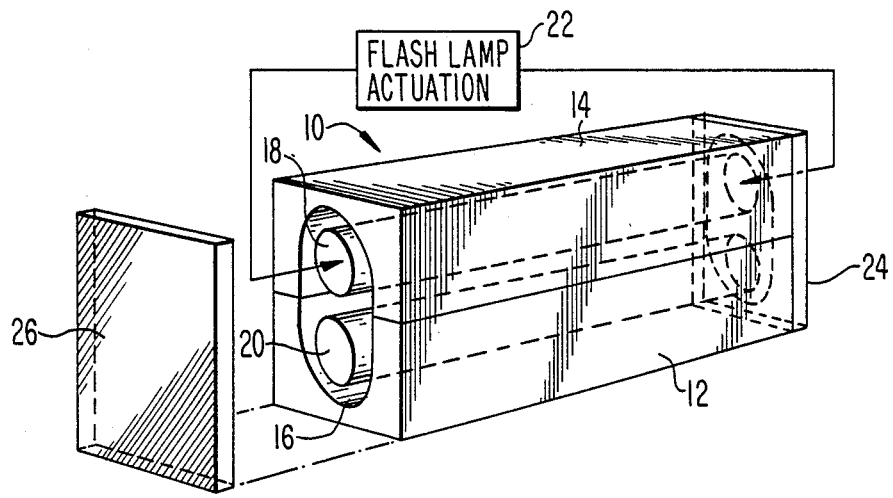
FIG. 1 is a diagrammatic illustration of a conventional ellipsoidally shaped laser cavity made with a diffuse sintered reflecting polymer.

Referring to FIG. 1, a laser cavity generally indicated by reference character 10 is provided by two opposed blocks of diffuse reflecting polymeric material 12 and 14 which form the traditional ellipsoidally-shaped cavity 16 when the blocks of diffuse reflecting material are placed together as illustrated. A flash lamp generally indicated at 18 is placed along one focus of the ellipsoidal cavity, whereas lasing media 20 is placed along the other focus of the cavity. The cavity is characterized by the fact that it is made solely of diffuse reflecting material in the form of a sintered polymer which may be shaped through machining. As illustrated, the flash lamp may be activated in a conventional manner by flash lamp actuation means 22. Note that the cavity thus formed may be Provided with conventional end closures 24 and 26.

Figure 2:
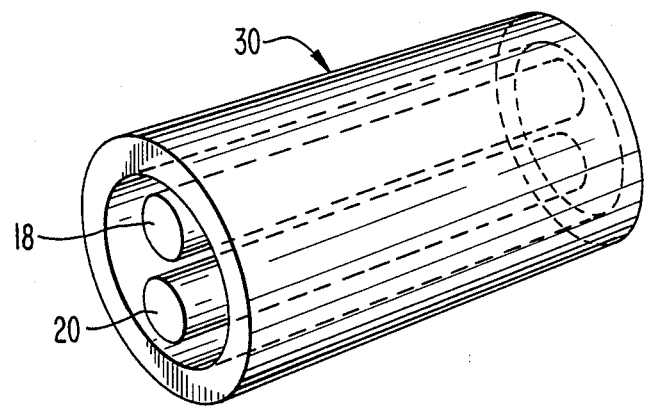
FIG. 2 is a diagrammatic illustration of a tubular laser cavity made from a diffuse sintered reflecting polymer.

While ellipsoidal laser cavities can be made with the subject highly reflective diffuse polymeric material, it is not necessary to fabricate such a precise shape. As illustrated in FIG. 2 a laser cavity generally indicated by reference character 30 may be in the form of a simple tube due to the use of the Subject diffusely reflecting material which has a reflectance approaching 99%. This gives considerable latitude to the positioning of flash lamp 18 or lasing media 20 within a laser cavity.

It is the property of diffusely reflecting materials that light is scattered in all directions within the cavity, making the placement of the laser elements within the cavity non-critical at least insofar as coupling energy from the flash lamp into the lasing media.

The exceptional reflectivity with a polymeric material is achieved through the utilization of the process described in connection with FIG. 3.

Figure 3:
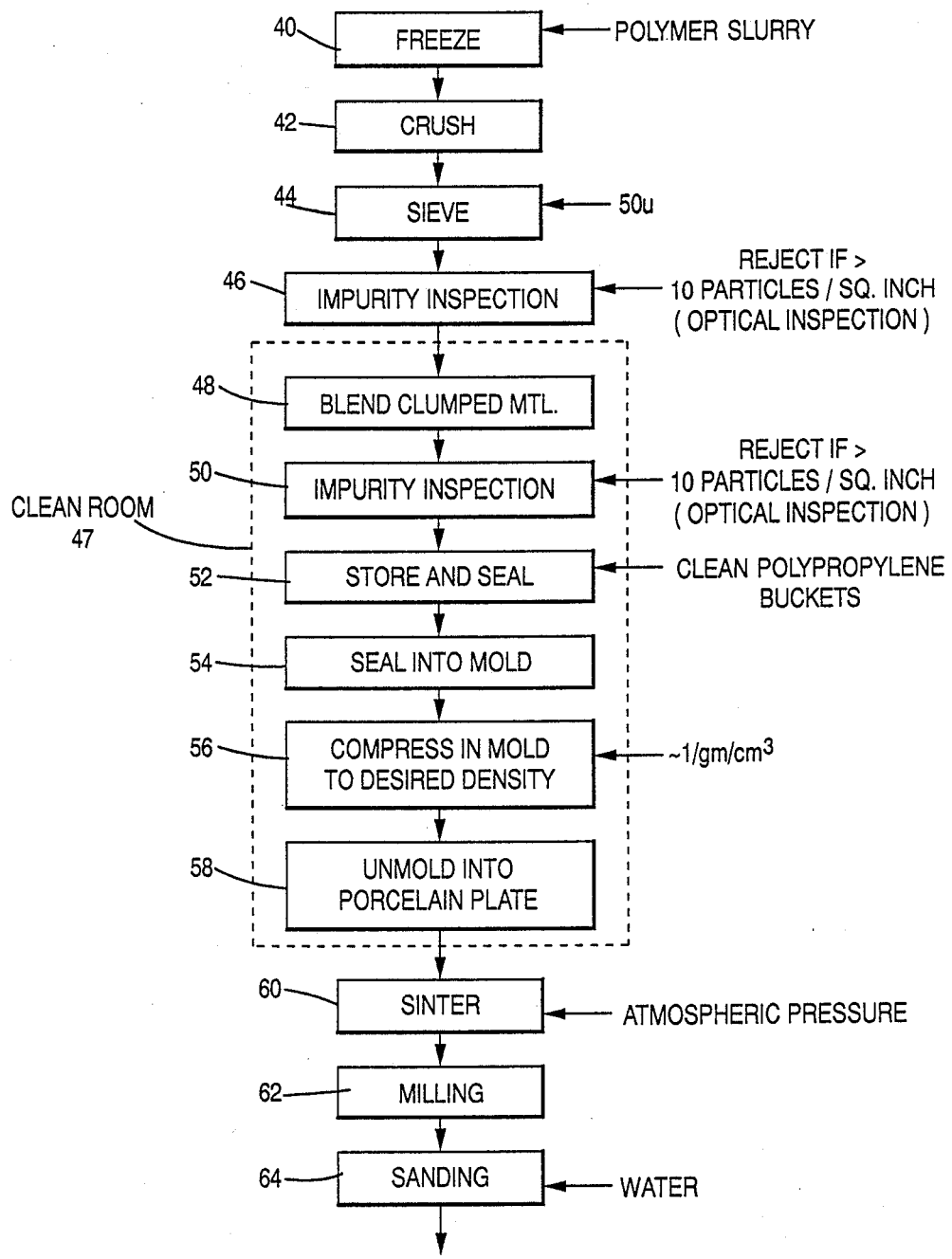
FIG. 3 is a block diagram illustrating preferred processing steps utilized in the fabrication of the subject diffuse reflecting polymer; and, FIG. 4 is a cross sectional view of a portion of the final sintered product made by the process of FIG. 3, in which the voids occupy between 30% and 50% of the final product, thereby to yield a better than 99% diffuse reflectance.

Referring now to FIG. 3, the manufacturing process will be described in terms of the utilization of PTFE. PTFE is available from a number of sources. Commercial PTFE resins are available essentially in two ranges of particle size, namely 20 to 50 microns and greater than 350 microns. Manufacturers of PTFE in less than 50 micron particle sizes are Ausimont, resins G80, F-5 or F-6; ICI America, resin Fluon-281; E. I. Dupont Demours & Co., resin 7A and 7C; and Sumitomo, resin M-12. The production process is fairly simple. The material is first frozen as shown at 40 at liquid nitrogen temperature. The resulting solid is then crushed as shown at 42; and is then sieved as shown at 44 to a preferred particle size of less than 50 microns. It will be noted that larger particle sizes are not easily machinable. Also, the larger particle size is not quite as reflective because the voids are not within the 30% to 50% range that is required for optimal reflectance.

As illustrated at 46, an impurity inspection of the sieved material is performed which involves rejection if there are greater than 10 impurity particles per square inch. This impurity concentration is established by optical inspection techniques, with the optical inspection having taken place after the material is isolated for 24 hours in a clean room 47. The optical inspection of a sample may be done either in the clean room or outside it.

Assuming a batch of material which meets the above requirements, the material is blended at 48 in the clean room, in one instance in a Cuisinart with stainless steel blades so as to finely divide any clumped material. The material is then optically inspected at 50 and checked for impurities, i.e. less than 10 impurity particles per square inch. Thereafter the material is stored and sealed at 52 in a clean polypropylene bucket that is used for nothing but storage of PTFE material. Then the material is made into blanks for laser cavity production. Note, that all presintering production is preferably accomplished in the clean room.

Figure 4:
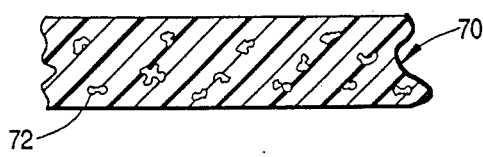

The cavities are made either in rectilinear or cylindrical form in which the amount of PTFE is weighed out, placed in the mold, and compressed at 56 to a predetermined density, which is the unmolded or presintering density. For PTFE the presintering density is on the order of 1.0 gram per cubic centimeter, with the compression being accomplished in the clean room. For maximum reflectance it has been found that 0.856 g/cm$^3$ of PTFE yields a 1.13 g/cm$^3$ density in the final product. It has also been found that if the initial packing density is raised above 1.5 g/cm$^3$, the final density is an unacceptable 2.2 g/cm$^3$ because the final product has an insufficient void volume. It will be appreciated that the higher the final density, the lower will be the reflectance due to a decrease in the void volume. As illustrated in FIG. 4, in a preferred embodiment, final product 70 has a void 72 volume of 30% to 50%.

Referring back to FIG. 3, the compressed material is unmolded at 58 and is placed on a ceramic plate which is positioned in the sintering oven where the cake or block of material is sintered as shown at 60. In one embodiment, the block is sintered at ambient pressure at 360° C. for better than four hours.

The sintered block is milled at 62 and is sanded at step 64. The sanding procedures essentially involve the use of silicon carbide grit paper, utilized under a stream of running water, the running water serving to wash away particles produced during the sanding process, keeping the pores or voids clean. Personnel are instructed to wear gloves during the process in order to keep finger oils or the like from getting into cavity material. Any contact with any non-polar material such as machine oil, grease, or the like provides contaminants that enter the voids and are very difficult to remove. Such contaminants may absorb light as the cavity is used, thereby decreasing the reflectance of the cavity material, and leading to the degradation of the laser cavity due to overheating.

Note that any contamination which is associated with the molding process is on the surface of the blank. Thus when the blank is machined, any contamination acquired during the molding or sintering process is removed.

The sintering process takes place at ambient pressure for two reasons. First, it is a matter of convenience. Secondly, sintering at ambient pressure maintains the critical low presintered density and thus provides the optimum void volume in final sintered product. This in turn yields the highest diffuse reflectance characteristic presently known. Note that an increase in initial packing pressure or sintering a low density material under mold pressure would result in a material with a lower void volume and thus inferior diffuse reflectance properties. In short, the use of atmospheric pressure sintering provides control over the density of the final product so that it is close to that of the unsintered product, with the final density resulting in void volumes of between 30% and 50%.

The effect of variation in density on reflectance and the mechanical properties of the sintered PTFE material are now described.

The following experiments were utilized to discover the general relationship between the density at which PTFE is prepared and its reflectance properties as a finished product. In the experimental procedure, varying amounts of PTFE were compressed in a cylindrical mold to a uniform volume of 17.4 cubic centimeters. The product of this operation was a discshaped sample 3.81 centimeters in diameter having a thickness of 1.27 centimeters. These discs were then sintered at a temperature of approximately 360° for a period of not less than four hours and allowed to cool very slowly inside the furnace. Samples were prepared by sanding with fine sand paper and reflectance properties of the sanded surface were measured on a reflectometer over a range of wavelengths from 250 nm to 2,500 nm. Note the density of each sample was altered during the sintering process. In general the term density, when applied to the PTFE sample can refer to either the density to which it was compressed prior to sintering or its final density after sintering. For the experiments described below, density is the presintered density, since the density of compression is easier to control and measure. The range of densities considered was limited, with a lower limit established by the requirement that the material be machinable and with the upper limit being established by the requirement that the material retain its properties as a diffuse reflector. It should be noted that at presintered densities higher than 2 g/cm$^3$, the sintered material is noticeably translucent in thin section and exhibits poor diffuse reflectance properties. To some extent this effect is observable even within the range of presintered densities considered here, namely 0.856–2 g/cm$^3$.

EXPERIMENT 1

Samples with a density of 0.856 g/cm$^3$ were prepared as described above by compressing 14.9 g of material to the standard volume and sintering. The result was a sample with excellent reflectance properties: reflectance was well over 95% over a range of wavelengths from 250 to 2,500 nm, and for 250–2,000 nm reflectance was greater than 98.5%. For 300–1,400 nm the reflectance was approximately 99%.

EXPERIMENT 2

Samples with a density of 1 g/cm$^3$ were prepared as above by using 17.4 g of material. The resulting reflectance properties were virtually indistinguishable from those observed in Experiment 1.

While the reflectance properties of these samples were very nearly as good as those observed in Ex. 1, their mechanical properties were significantly better; with an increase in density, the material becomes much less susceptible to crumbling or tearing during the machining process.

EXPERIMENT 3

Samples with a density of 1.17 g/cm$^3$ were prepared as above by using 20.4 g of material. For the visible region, the reflectance of these samples sloped downward with increasing wavelength, falling below the reflectance observed in Ex. 1 by about 1% at 1,800 nm, and by 3–4% at 2,500 nm. This lack of spectral flatness makes the material less efficient as a reflectance material at this density, although its performance is still superior to that of materials currently in common use.

EXPERIMENT 4

Samples with a density of 1.5 g/cm$^3$ were prepared as above by using 26.1 g of material. Reflectance of these samples exhibited a significant slope, falling from over 95% at a point within the visible range to as low as 50% at longer wavelengths. This 1.5 g/cm$^3$ density thus was found to be the practical upper limit for PTFE.

At this density, these samples exhibited less shrinkage during sintering than those of the experiments above, and they were noticeably harder.

EXPERIMENT 5

Samples with a density of 2 g/cm$^3$ were prepared as above by using 34.8 g of material. Reflectance of these samples exhibited a relatively drastic slope, dropping from greater than 95% in the visible to 20% at 2,500 nm.

At this density, the material exhibited very little shrinkage during sintering, and these samples were significantly harder than the others.

It can be seen from the above experiments that the presintered density of PTFE is an important factor in determining reflectance properties. A very high reflectance and a high degree of spectral flatness over a range from 250–2,500 nm is obtainable at a compression of near 1 g/cm$^3$, while at higher presintered densities, reflectance decreases significantly, especially at longer wavelengths. For PTFE, the optimum presintered density considering both machinability and reflectance properties, is therefore very near 1 g/cm$^3$.

Note that other resins have optimal presintered densities which can be obtained empirically. As long as the void volume is between 30% and 50% after sintering, optimal diffuse reflectance is achieved.

Having above indicated a preferred embodiment of the present invention, it will occur to those skilled in the art that modifications and alternatives can be practiced within the spirit of the invention. It is accordingly intended to define the scope of the invention only as indicated in the following claims:

I claim:

1. A laser pump cavity made of sintered material having at least one fluorinated aliphatic long chain addition polymer which has at least one monomer, wherein at least one fluorine atom is attached to a chain carbon atom, the sintered material having void volumes between 30%–50% such that said material has a diffuse reflective characteristic of greater than 98.5%.

2. The laser pump cavity of claim 1 wherein said material is sintered at atmospheric pressure.

3. A laser pump cavity having highly diffusely reflective walls including sintered polymeric material as a diffuse reflector.

4. The laser pump cavity of claim 2 wherein said sintered material is PTFE.

5. The laser pump cavity of claim 4 wherein said PTFE is sintered at atmospheric pressure.

6. The laser pump cavity of claim 5 wherein the presintered density of PTFE is between 0.8 g/cm$^3$ and 1.5 g/cm$^3$.

7. The laser pump cavity of claim 2 wherein said sintered polymeric material has a diffuse reflectance of approximately 99% in the visible and near IR regions of the electromagnetic spectrum.

8. A method of making a polymeric material having an optimal diffuse reflectance characteristic comprising the steps of:
 sealing granules of said polymeric material into a mold;
 compressing said material in said mold into a cake to be sintered and having a density corresponding to that at which optimal reflectivity occurs in the visible and near IR regions of the electromagnetic spectrum; and, sintering said compressed cake such that said density provides a sintered molded cake with a 30%–50% void volume,
 sintering said compressed material; and
 unmolding said cake.

9. The method of claim 8 and further including the step of sintering said cake under atmospheric pressure, thereby to more closely preserve said presintered density in the sintered cake.

10. The method of claim 9 and further including the steps of milling and sanding said sintered cake into a desired shape.

11. The method of claim 10 wherein said sanding step includes washing with water.

12. The method of claim 11 wherein no lubricant other than a polar material is used in said milling and washing steps.

13. The method of claim 12 and further including the steps of inspecting said granules for impurity particles prior to said sealing step; and using only granules having an impurity particle content of less than 10 particles per square inch, whereby laser grade material can be achieved in the sintered, milled and sanded cake.

14. The method of claim 13 and further including the step of performing all presintering steps in a clean room, thereby to assure achieving purity of said laser grade material.

15. The method of claim 8 wherein said particles are less than 50 microns in diameter, thereby to assist in attaining said 30–50% void volume.

16. The method of claim 8 wherein said granules have an impurity particle content of less than 10 per square inch, whereby laser grade material is established for said cake.

17. The method of claim 8 wherein said material is PTFE and wherein said density is between 0.8 g/cm$^3$ and 1.5 g/cm$^3$.

* * * * *